US012442450B2

(12) United States Patent
Nakamura

(10) Patent No.: US 12,442,450 B2
(45) Date of Patent: Oct. 14, 2025

(54) SHAFT SEALING DEVICE

(71) Applicant: EAGLEBURGMANN JAPAN CO., LTD., Tokyo (JP)

(72) Inventor: Ryo Nakamura, Tokyo (JP)

(73) Assignee: EAGLEBURGMANN JAPAN CO., LTD., Tokyo (JP)

( * ) Notice: Subject to any disclaimer, the term of this patent is extended or adjusted under 35 U.S.C. 154(b) by 0 days.

(21) Appl. No.: 18/285,487

(22) PCT Filed: Mar. 30, 2022

(86) PCT No.: PCT/JP2022/016110
§ 371 (c)(1),
(2) Date: Oct. 3, 2023

(87) PCT Pub. No.: WO2022/215631
PCT Pub. Date: Oct. 13, 2022

(65) Prior Publication Data
US 2024/0183449 A1    Jun. 6, 2024

(30) Foreign Application Priority Data
Apr. 8, 2021    (JP) .................................. 2021-065771

(51) Int. Cl.
*F16J 15/34*    (2006.01)
*B63H 23/32*    (2006.01)

(52) U.S. Cl.
CPC ........ *F16J 15/3464* (2013.01); *B63H 23/321* (2013.01); *F16J 15/3456* (2013.01); *F16J 15/3404* (2013.01)

(58) Field of Classification Search
CPC .. F16J 15/3404; F16J 15/3456; F16J 15/3464; B63H 23/321
See application file for complete search history.

(56) References Cited

U.S. PATENT DOCUMENTS 3,330,564 A * 7/1967 Sikora ..................... F16C 33/78
                                                                      277/374
3,601,412 A * 8/1971 Malmstrom ......... F16J 15/3456
                                                                      277/367
(Continued)

FOREIGN PATENT DOCUMENTS

CN         103051099         4/2013      ............. H02K 5/124
DE    102009054198 A1       5/2011
(Continued)

OTHER PUBLICATIONS

International Search Report and Written Opinion issued in PCT/JP2022/016110, dated Jun. 14, 2022, with English translation, 11 pages.

(Continued)

*Primary Examiner* — Nicholas L Foster
(74) *Attorney, Agent, or Firm* — HAYES SOLOWAY P.C.

(57) ABSTRACT

A shaft sealing device sealing a sealed fluid includes a mating ring having a sliding surface and attached to a casing into which a rotating shaft is inserted, a commonly used seal ring having a sliding surface that slides against the sliding surface of the mating ring, and attached to the rotating shaft, and the sliding surfaces, and a backup seal ring attached to the rotating shaft on a counter-sealed fluid side in an axial direction with respect to the sliding surface of the mating ring and the sliding surface of the commonly used seal ring, and having a sliding surface facing the sealed fluid in the axial direction. The backup seal ring is movable toward the sealed fluid in the axial direction.

4 Claims, 3 Drawing Sheets

(56) References Cited

U.S. PATENT DOCUMENTS

| | | | |
|---|---|---|---|
| 3,632,117 A | 1/1972 | Villasor | |
| 3,703,296 A * | 11/1972 | Malmstrom | F16J 15/3456 277/408 |
| 3,727,924 A | 4/1973 | Henderson | |
| 3,746,350 A | 7/1973 | Mayer et al. | |
| 3,843,140 A | 10/1974 | Mayer et al. | |
| 3,926,442 A | 12/1975 | Muller | |
| 4,448,425 A * | 5/1984 | von Bergen | B63H 23/321 277/346 |
| 4,494,759 A * | 1/1985 | Kieffer | F16J 15/3456 277/377 |
| 4,523,764 A | 6/1985 | Albers et al. | |
| 4,529,209 A | 7/1985 | Nii et al. | |
| 4,759,553 A * | 7/1988 | Goodman | F16J 15/3456 277/374 |
| 5,718,560 A | 2/1998 | Lorenzen | |
| 9,868,502 B2 * | 1/2018 | Saito | B63H 23/321 |
| 2012/0201673 A1 | 8/2012 | Aoike et al. | |
| 2015/0137458 A1 * | 5/2015 | Saito | F16J 15/002 277/500 |
| 2020/0032809 A1 | 1/2020 | Werdecker et al. | F04D 29/08 |
| 2020/0080641 A1 | 3/2020 | Shimasaki | |
| 2021/0131564 A1 * | 5/2021 | Nakamura | F16J 15/3268 |
| 2022/0235790 A1 | 7/2022 | Goldswain et al. | |

FOREIGN PATENT DOCUMENTS

| | | | |
|---|---|---|---|
| JP | S6166266 | 5/1986 | F16J 15/34 |
| JP | H2124374 | 10/1990 | F16J 15/34 |
| JP | 200065219 | 3/2000 | F16J 15/34 |
| JP | 2013248921 A | 12/2013 | |
| JP | 2014156789 | 8/2014 | F04D 13/08 |
| JP | 2016186297 | 10/2016 | F04D 13/08 |
| JP | 201767049 | 4/2017 | F04D 29/58 |
| JP | 2020506348 | 2/2020 | F16J 15/38 |

OTHER PUBLICATIONS

International Preliminary Report on Patentability issued in PCT/JP2022/016110, dated Oct. 10, 2023, 4 pages.
International Search Report and Written Opinion issued in PCT/JP2022/009707, dated Apr. 26, 2022, with English translation, 11 pages.
International Preliminary Report on Patentability issued in PCT/JP2022/009707, dated Sep. 12, 2023, 5 pages.
U.S. Appl. No. 18/280,921, filed Sep. 7, 2023, Negishi et al.

* cited by examiner

SHAFT SEALING DEVICE

TECHNICAL FIELD

The present invention relates to a shaft sealing device that seals a rotating shaft.

BACKGROUND ART

As a shaft sealing device that prevents a leakage of a sealed fluid around a rotating shaft in a rotating machine, for example, a shaft sealing device using a mechanical seal composed of a pair of annular sliding components rotating relative to each other and sliding against each other at a pair of sliding surfaces, or a shaft sealing device using a lip seal rotating and sliding relative to a sliding surface of the rotating shaft or a housing is known.

For example, a shaft sealing device used in a propulsion device for a ship shown in patent Citation 1 is configured such that a commonly used seal ring is disposed in a casing attached to a stern tube into which a rotating shaft on which a propeller for propulsion is provided is inserted, so as to be slidable from an inboard side in an axial direction. In addition, the commonly used seal ring is attached to a stepped portion on one axial end side of a clamp ring fixed to the rotating shaft, and a backup seal ring is mounted on a stepped portion on the other axial end side of the clamp ring. Further, a lip seal is disposed on an outboard side of the commonly used seal ring, and seawater flows toward the outboard side, so that the lip seal becomes non-contact with the rotating shaft, and the commonly used seal ring seals the seawater, thereby stopping the flow of the seawater. Therefore, the lip seal can come into contact with the rotating shaft and can seal the seawater.

Due to wear over time of the commonly used seal ring, sealing performance of the commonly used seal ring may decrease and the sealed fluid may leak to an inboard space. In the shaft sealing device of patent Citation 1, in the foregoing event of an emergency, in a state where the rotation of the rotating shaft is stopped and the leakage of the seawater in the casing to an inboard space side is sealed with the lip seal, it is possible to perform repair by removing the commonly used seal ring from the clamp ring and mounting the backup seal ring on the stepped portion at one axial end of the clamp ring. Thereafter, by rotating the rotating shaft and causing the seawater to flow to the outboard side, the seawater is sealed with the backup seal ring.

CITATION LIST

Patent Literature

Patent Citation 1: Microfilm of JP H1-32985 U (JP H2-124374 U) (Page 10, FIG. 1)

SUMMARY OF INVENTION

Technical Problem

In the shaft sealing device of patent Citation 1, it is necessary to perform the work of removing the commonly used seal ring, which has decreased in sealing performance, from the clamping ring, and the work of increasing the diameter of the backup seal ring and moving the backup seal ring from the stepped portion at the other end to the stepped portion at one end of the clamping ring, so that the repair work becomes complicated.

The present invention is conceived in view of such a problem, and an object of the present invention is to provide a shaft sealing device in which a leakage of a sealed fluid to a leakage side space can be easily repaired.

Solution to Problem

In order to solve the foregoing problem, according to the present invention, there is provided a shaft sealing device that seals a sealed fluid, including: a mating ring having a sliding surface and attached to a casing into which a rotating shaft is inserted; a commonly used seal ring having a sliding surface that slides against the sliding surface of the mating ring, and attached to the rotating shaft; and a backup seal ring attached to the rotating shaft on a counter-sealed fluid side in an axial direction with respect to the sliding surface of the mating ring and the sliding surface of the commonly used seal ring, and having a sliding surface facing the sealed fluid in the axial direction, wherein the backup seal ring is movable toward the sealed fluid in the axial direction. According to the aforesaid features of the present invention, in the event of an emergency in which a malfunction occurs in the commonly used seal ring, the sealed fluid can be sealed with the backup seal ring by moving the backup seal ring toward the sealed fluid, so that emergency repair for a leakage of the sealed fluid to a leakage side space can be easily performed.

It may be preferable that the backup seal ring is attached to the rotating shaft by a tightening device by which a tightening force is adjustable. According to this preferable configuration, the backup seal ring can be easily moved along the rotating shaft by loosening the tightening device, and the backup seal ring can be fixed to the rotating shaft by tightening of the tightening device.

It may be preferable that a component forming the commonly used seal ring and a component forming the backup seal ring are identical with each other and disposed in a reverse orientation to each other. According to this preferable configuration, since the commonly used seal ring and the backup seal ring are the same components, the structure is simplified and attachment errors are unlikely to occur.

It may be preferable that a flow path configured for supplying the sealed fluid from an outside is connected to a sealed fluid side space inside the casing in which the commonly used seal ring is disposed. According to this preferable configuration, the flow of the sealed fluid is generated in the vicinity of the mating ring and the commonly used seal ring, so that the retention of contaminations in the vicinity of the sliding surface of the mating ring and the sliding surface of the commonly used seal ring can be suppressed. For this reason, even in a situation where a malfunction occurs in the commonly used seal ring and a relatively large amount of contaminations are easily generated, the entering of the contaminations between the sliding surface of the backup seal ring and another sliding surface of the mating ring can be suppressed.

It may be preferable that the shaft sealing device is a water-lubricated stern tube shaft sealing device. According to this preferable configuration, in the event of an emergency, the intrusion of outboard water into a ship can be suppressed.

DESCRIPTION OF EMBODIMENTS

Modes for implementing a shaft sealing device according to the present invention will be described below based on embodiments.

First Embodiment

A shaft sealing device according to a first embodiment of the present invention will be described with reference to FIGS. 1 and 2. Hereinafter, the left and right sides of FIG. 1 will be described as left and right sides of the shaft sealing device. Specifically, a side on which a backup seal ring 7 is disposed and an opposite side will be described as the right side and the left side, respectively.

Figure 1:
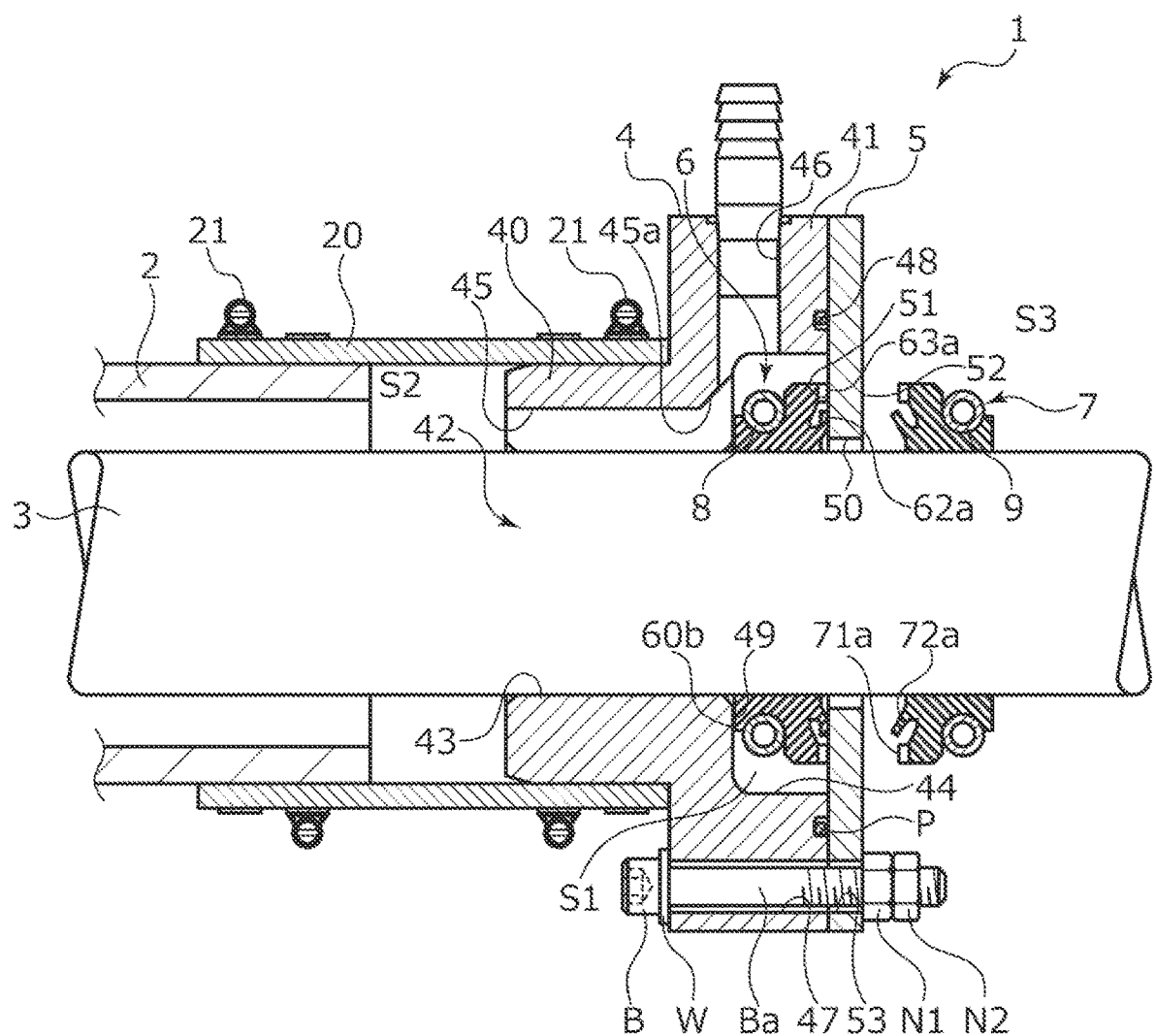
FIG. 1 is a cross-sectional view of a shaft sealing device according to a first embodiment of the present invention.

As illustrated in FIG. 1, a shaft sealing device 1 is a water-lubricated stern tube shaft sealing device applied to an inboard side of a propulsion device as a leakage side space S2 in a ship, and seals a rotating shaft 3 penetrating through a housing 2 having a tubular shape. Incidentally, the shaft sealing device 1 is not limited to being applied to ships, and may be applied to rotating machines such as automobiles and general industrial machines.

A propeller for propulsion is attached to an outboard side end portion of the rotating shaft 3, namely, an axially left end portion (not illustrated), and a stern tube bearing that supports the rotating shaft 3 is disposed in the vicinity of the propeller (not illustrated).

The shaft sealing device 1 mainly includes a casing 4, a mating ring 5, a seal ring 6, and the backup seal ring 7.

The casing 4 has a cylindrical shape with a flange including a tubular portion 40 extending in an outboard direction, and a flange 41 extending from an axially right end portion of the tubular portion 40 to a radially outward side.

The tubular portion 40 of the casing 4 is internally fitted to a joint hose 20, and is fixed by a clamping ring 21. In addition, an axially right end portion of the housing 2 is internally fitted to the joint hose 20, and is fixed by the clamping ring 21.

A through hole 42 penetrating through the casing 4 in an axial direction is formed in the casing 4. Specifically, the through hole 42 includes a small diameter hole portion 43 extending rightward in the axial direction from an axially left end surface of the tubular portion 40, and a large diameter hole portion 44 extending rightward in the axial direction and defining a sealed fluid side space S1, and the small diameter hole portion 43 and the large diameter hole portion 44 are connected to an inner end surface 49 having an annular shape and extending in a radial direction.

In addition, a plurality of grooves 45 opening to a radially inward side and communicating with the space S1 and the space S2 on the outboard side of the casing 4 are formed in the tubular portion 40, and axially right end surfaces of the grooves 45 become a tapered surface 45a that is increased in diameter toward the right side.

In addition, a communication hole 46 communicating with a radially outward side and a radially inward side of the flange 41 formed at the axially right end portion is formed in the casing 4, and a radially inward side of the communication hole 46 communicates with the space S1.

The mating ring 5 is an annular plate member made of stainless steel and having a through-flow path 50 penetrating therethrough in the axial direction. A radially inner end portion of an axially left end surface of the mating ring 5 is a sliding surface 51 against which sliding surfaces 62a and 63a of the commonly used seal ring 6 slide, and a radially inner end portion of an axially right end surface of the mating ring 5 is a sliding surface 52 as another sliding surface against which sliding surfaces 72a and 73a of the backup seal ring 7 slide are slidable. Incidentally, the mating ring 5 is not limited to being made of stainless steel.

The mating ring 5 is attached to the casing 4 by inserting a male thread portion Ba of a bolt B inserted into a washer W, into each of a plurality of axial through holes 53 equally disposed in a radially outer end portion of the mating ring 5 and into each of axial through holes 47 penetrating through the flange 41 of the casing 4 in the axial direction, and by screwing double nuts N1 and N2.

In addition, in a usage state of the shaft sealing device 1 in which the double nuts N1 and N2 are screwed, the seal ring 6 is assembled to the casing 4 in a state where an axially left end portion 60b of the seal ring 6 is in contact with the inner end surface 49 of the casing 4 and the sliding surface 51 is in surface contact with the sliding surfaces 62a and 63a of the seal ring 6 so as to be slidable relative to each other. Incidentally, in the usage state of the shaft sealing device 1, the axially left end portion 60b of the seal ring 6 and the inner end surface 49 of the casing 4 may be slightly separated from each other.

In addition, since an O-ring P is disposed in an annular groove 48 between the casing 4 and the mating ring 5, the annular groove 48 being recessed leftward in the axial direction from an axially right end surface of the flange 41 of the casing 4, seawater introduced into the through hole 42 is prevented from leaking to the inboard side.

Figure 2:
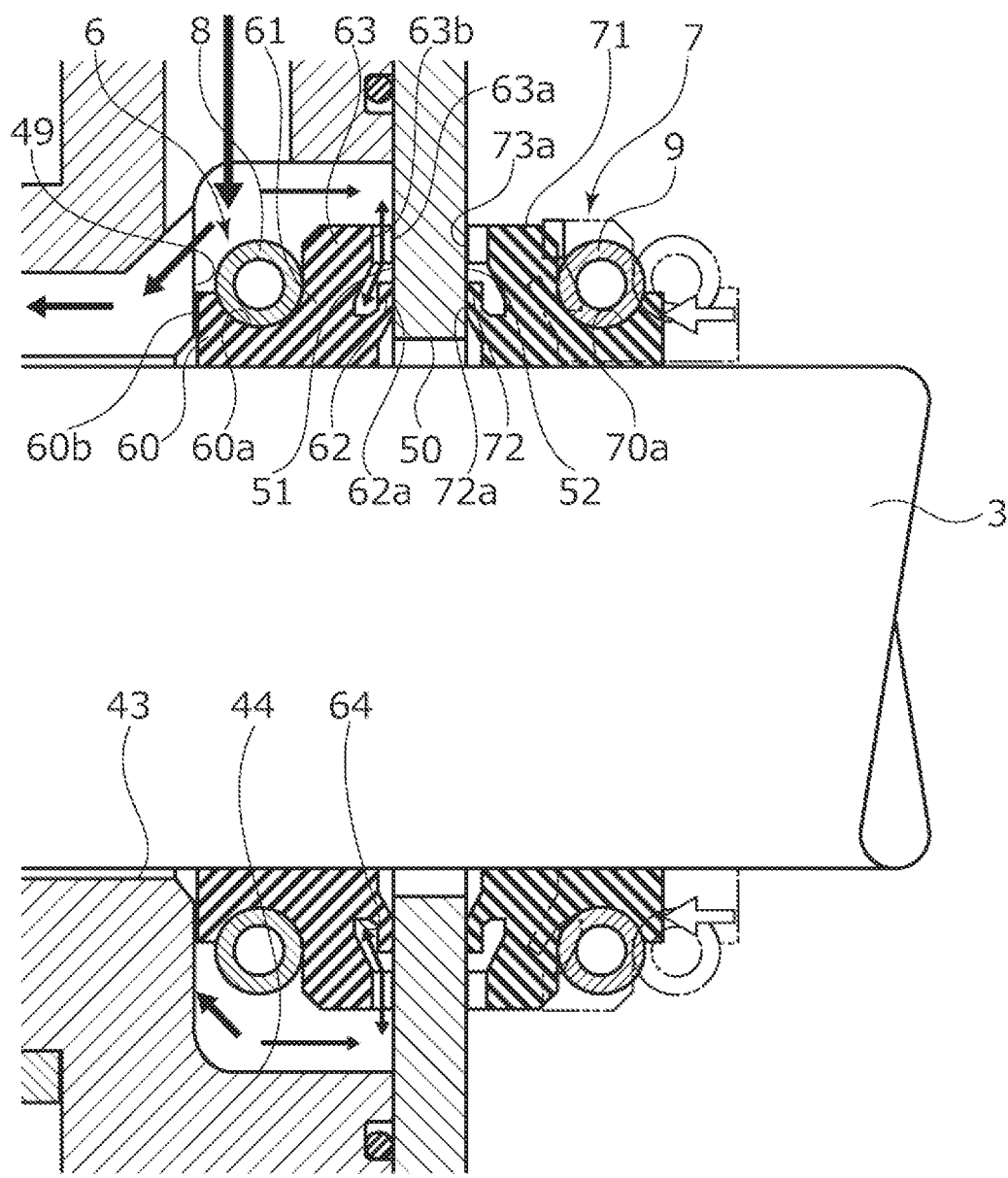
FIG. 2 is an enlarged cross-sectional view of main parts of the shaft sealing device according to the first embodiment of the present invention.

Referring to FIG. 2, the commonly used seal ring 6 is made of nitrile rubber, and includes an attachment portion 60 having a cylindrical shape, and a seal portion 61 having a large diameter and extending to the radially outward side from the attachment portion. A thin lip 62 curving and obliquely extending in a radially outward direction, and a support leg 63 located on a radially outward side of the lip 62 and thicker than the lip 62 are provided on a radially inward side of the seal portion 61, and is formed in an annular shape. Incidentally, the commonly used seal ring 6 is not limited to being made of nitrile rubber.

An axially right end surface of the lip 62 is the sliding surface 62a, and an axially right end surface of the support leg 63 is the sliding surface 63a. Since the support leg 63 mainly receives an axial force, the lip 62 easily exhibits sealing performance.

In addition, a plurality of communication grooves 63b penetrating through an axially right end portion in the radial direction are equally disposed in the support leg 63, and the communication grooves 63b communicate with an annular groove 64 formed between the lip 62 and the support leg 63.

The commonly used seal ring 6 is fixed to the rotating shaft 3 by being externally mounted on the rotating shaft 3 and by externally fitting a garter spring 8 into an annular groove 60a having an annular shape and recessed on a radially outward side of the attachment portion 60. In addition, the commonly used seal ring 6 is disposed inside the large diameter hole portion 44 of the casing 4.

The backup seal ring 7 has the same configuration as that of the seal ring 6, and is disposed in a reverse orientation to the seal ring 6, and the backup seal ring 7 and the seal ring 6 face each other. For convenience of description, common descriptions will be omitted.

Since the commonly used seal ring 6 and the backup seal ring 7 are the same component and can be interchangeably used, the structure of the shaft sealing device 1 can be simplified, and assembly errors are unlikely to occur.

As illustrated in FIGS. 1 and 2, during normal operation, namely, in a state where the commonly used seal ring 6 functions sufficiently and the fluid does not leak from the commonly used seal ring 6 to a backup seal ring 7 side, in other words, to an inboard side space S3, the backup seal ring 7 is fixed to the rotating shaft 3 by externally fitting a garter spring 9 as a tightening device in a state where the sliding surfaces 72a and 73a are separated from the sliding surface 52 of the mating ring 5.

Next, the sealing function of the shaft sealing device 1 will be described.

First, a normal operation will be described. As illustrated in FIG. 1, seawater delivered from the outside of the ship as a sealed fluid delivered by a pump (not illustrated) is introduced into the through hole 42 and the space S1 through the communication hole 46 of a connector C and the casing 4.

As indicated by black arrows in FIG. 2, the seawater is discharged to the outside of the ship through the communication hole 46 and the through hole 42.

In addition, as indicated by the black arrows in FIG. 2, some of the seawater flows into and out of the annular groove 64 through the communication grooves 63b of the seal ring 6.

The seawater in the annular groove 64 presses the lip 62 of the commonly used seal ring 6 toward the mating ring 5, so that the state of close contact between the sliding surface 62a of the lip 62 and the sliding surface 51 of the mating ring 5 is maintained.

In addition, when the rotating shaft 3 moves leftward in the axial direction relative to the casing 4 due to vibration or the like, the axially left end portion 60b of the commonly used seal ring 6 comes into contact with the inner end surface 49 of the casing 4, so that the commonly used seal ring 6 is restricted from excessively moving leftward in the axial direction. Therefore, the state of close contact between the sliding surface 62a of the lip 62 and the sliding surface 51 of the mating ring 5 can be maintained.

In addition, when the rotating shaft 3 moves rightward in the axial direction relative to the casing 4, the support leg 63 with high rigidity mainly receives a force, and the lip 62 of the commonly used seal ring 6 is easily deformed toward an annular groove 64 side, so that the state of close contact between the sliding surface 62a of the lip 62 and the sliding surface 51 of the mating ring 5 can be maintained.

In addition, contaminations or impurities in the annular groove 64 of the commonly used seal ring 6 are easily discharged from the annular groove 64 through a communication groove 61b to the space S1 by the flow in a rotation direction of the seawater or a centrifugal force. In such a manner, the contaminations or impurities that have flowed into the annular groove 64 can be discharged.

In addition, when the seawater flows into the grooves 45 from the large diameter hole portion 44 defining the space S1, the seawater is guided by the tapered surface 45a of the grooves 45, so that the contaminations or impurities can be quickly discharged to the outside of the ship (not illustrated).

Next, a state where in the event of an emergency, namely, due to a malfunction such as wear or deterioration over time of the commonly used seal ring 6, the seawater introduced into the through hole 42 leaks to a space S3 side through the through flow path 50 of the mating ring 5 will be described.

In the event of an emergency, first, the rotation of the rotating shaft 3 is stopped. Subsequently, the garter spring 9 is expanded in the radially outward direction to reduce a force that is applied to the backup seal ring 7 to tighten the backup seal ring 7 to the rotating shaft 3, and as indicated by white arrows in FIG. 2, the backup seal ring 7 is moved leftward in the axial direction (namely, the sealed fluid side) to adjust the attachment position in the axial direction of the backup seal ring 7 such that the sliding surfaces 72a and 73a of the backup seal ring 7 are brought into close contact with the sliding surface 52 of the mating ring 5, namely, the backup seal ring 7 is approached the mating ring 5. Here, the backup seal ring 7 is separated from the mating ring 5 in the axial direction, and is disposed on a counter-sealed fluid side in the axial direction of the sliding surface 51 of the mating ring 5 and of the sliding surfaces 62a and 63a of the seal ring 6.

Next, repair work is completed by externally mounting the garter spring 9 into an annular groove 70a of the backup seal ring 7 again, and by tightening and fixing the backup seal ring 7 to the rotating shaft 3.

Thereafter, when the rotating shaft 3 is rotated, the sliding surface 72a of the backup seal ring 7 rotates and slides relative to the sliding surface 52 of the mating ring 5 in the state of close contact therewith, and seals the sealed fluid.

In such a manner, in the repair work, the backup seal ring 7 can be easily moved and fixed by using the garter spring 9 as a tightening device. In addition, emergency repair work is easy since the repair work requires only moving the backup seal ring 7 in the axial direction without expanding the backup seal ring 7.

In addition, since the commonly used seal ring 6 is not removed during repair work, a large amount of the seawater does not leak to the space S3 during the work of moving the backup seal ring 7. In such a manner, separately providing an annular lip seal that functions during repair as in patent Citation 1 is not required, and the configuration of the shaft sealing device 1 can be simplified.

In addition, since the backup seal ring 7 is disposed on the inboard side of the seal ring 6, repair work is easily performed from the inside of the ship.

In addition, when an emergency measure is taken after repair is completed, by supplementing sealing performance with the backup seal ring 7 in addition to maintaining the state where the sliding surface 51 of the mating ring 5 and the sliding surfaces 62a and 63a of the seal ring 6 rotate and slide relative to each other, the leakage of the seawater to the inboard side can be reduced as much as possible. Namely, the intrusion of the seawater into the ship can be suppressed.

Second Embodiment

Figure 3:
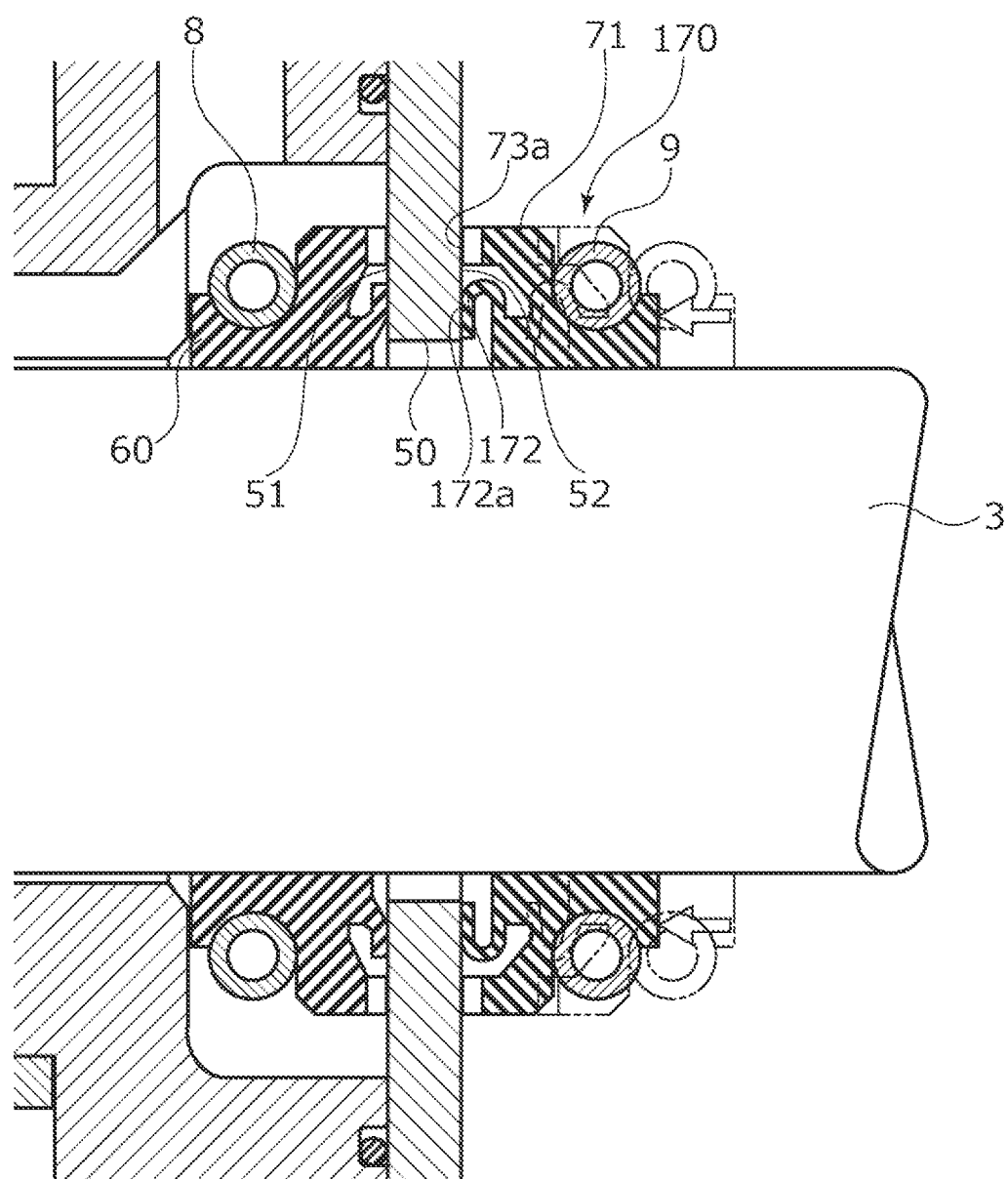
FIG. 3 is an enlarged cross-sectional view of main parts of a shaft sealing device according to a second embodiment of the present invention.

Next, a shaft sealing device according to a second embodiment of the present invention will be described with reference to FIG. 3. Incidentally, descriptions of the same duplicate configurations as the configurations of the first embodiment will be omitted.

A backup seal ring 170 of the second embodiment is such that a thin lip 172 having a substantially U shape, specifically, extending in the radially outward direction, then being folded back, and then obliquely extending in a radially inward direction and slightly toward the left side is formed on a radially inward side of a seal portion 171, and is different in shape and extending direction from the lip 62 of the first embodiment.

Accordingly, when an emergency measure is taken after repair is completed, a tip of the lip 172 receives a force from the sealed fluid toward a sliding surface 52 side, and a sliding surface 172a provides good sealing performance. Incidentally, the lip 172 has a U shape, but may have a shape simply extending from the seal portion in the radially inward direction and obliquely extending toward the left side.

The embodiments of the present invention have been described above with reference to the drawings, however, the specific configurations are not limited to the embodiments, and modifications or additions that are made without departing from the scope of the present invention are included in the present invention.

For example, in the first and second embodiments, the configuration in which both the commonly used seal ring and the backup seal ring are lip type seal rings has been described, however, each of the commonly used seal ring and the backup seal ring is not limited to the lip type, for example, may be a rotary seal ring of a mechanical seal, and may be changed as appropriate.

In addition, in the first embodiment, the commonly used seal ring and the backup seal ring have been described as having the same configuration, but are not limited thereto, and may be seal rings having different shapes.

In addition, in the first and second embodiments, the configuration in which the commonly used seal ring and the backup seal ring are directly fixed to the rotating shaft has been described, but are not limited thereto, for example, the commonly used seal ring and the backup seal ring may be fixed via a sleeve fixed to the rotating shaft, and may be rotatable together with the rotating shaft. When the sleeve is used, the backup seal ring can be moved with a small force, together with the sleeve, by loosening fixing means to the rotating shaft during repair, so that repair work is easy.

In addition, in the first and second embodiments, the configuration in which the commonly used seal ring and the backup seal ring are formed in a continuous annular shape has been described, however, the commonly used seal ring and the backup seal ring are not limited thereto, and may be configured by assembling a plurality of divided pieces.

In addition, in the first and second embodiments, the configuration in which the tightening device is a garter spring has been described, however, the tightening device is not limited thereto, may be a clamping ring, a pressing ring, or a tightening band, and may be changed as appropriate.

REFERENCE SIGNS LIST

1 Shaft sealing device
3 Rotating shaft
4 Casing
5 Mating ring
6 Commonly used seal ring
7 Backup seal ring
9 Garter spring (tightening device)
51 Sliding surface
52 Sliding surface (another sliding surface)
62a Sliding surface
72a Sliding surface
C Connector (flow path)
S1 Sealed fluid side space
S2 Leakage side space
S3 Inboard side space

The invention claimed is:

1. A shaft sealing device that seals a sealed fluid, comprising:
 a mating ring having a sliding surface and attached to a casing into which a rotating shaft is inserted;
 a seal ring having a sliding surface that slides against the sliding surface of the mating ring, and attached to the rotating shaft; and
 a backup seal ring attached to the rotating shaft on a counter-sealed fluid side in an axial direction with respect to the sliding surface of the mating ring and the sliding surface of the seal ring, and having a sliding surface facing the sealed fluid in the axial direction,
 wherein the casing is provided with a communication hole configured to communicate with a space to which an outer peripheral surface of the seal ring faces,
 the casing has an inner peripheral surface provided with a groove configured to communicate with the space and extending in an axial direction,
 the groove has a tapered surface which is adjacent to the space and which is increased in a diameter toward the space,
 the sealed fluid is supplied from an outside of the casing to the space via the communication hole and discharged via groove, and
 wherein the backup seal ring is attached to the rotating shaft, by a tightening device by which a tightening force is adjustable, at a position at which the backup seal ring is separated from the mating ring.

2. The shaft sealing device according to claim 1,
 wherein a component forming the seal ring and a component forming the backup seal ring are identical with each other, and disposed in a reverse orientation to each other.

3. The shaft sealing device according to claim 1,
 wherein the shaft sealing device is a water-lubricated stern tube shaft sealing device.

4. The shaft sealing device according to claim 2,
 wherein the shaft sealing device is a water-lubricated stern tube shaft sealing device.

* * * * *